April 2, 1957     C. SCHULTZ     2,787,320
DUAL FACED PHOTOGRAPHIC SCREEN
Filed Dec. 14, 1955     2 Sheets-Sheet 1
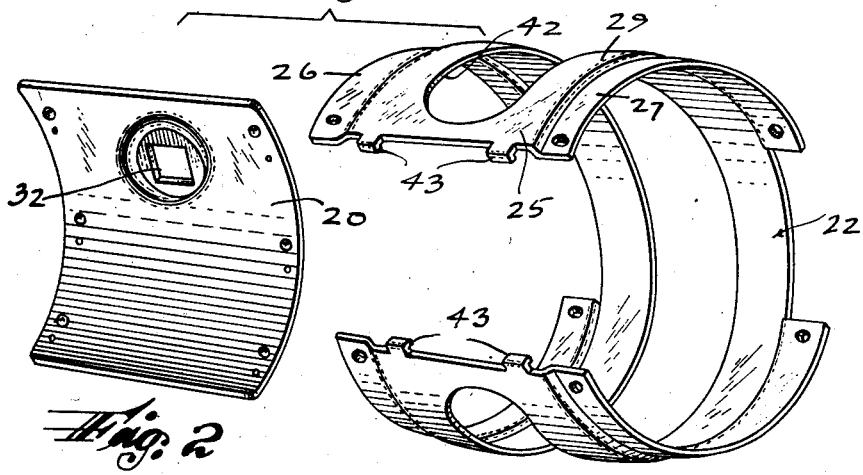
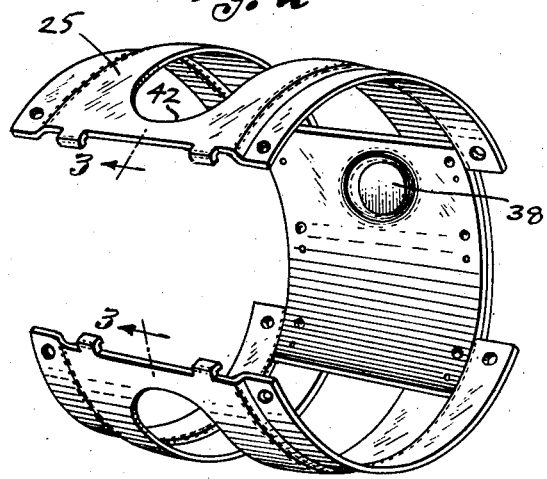
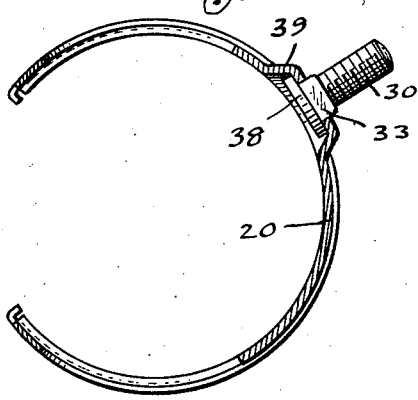
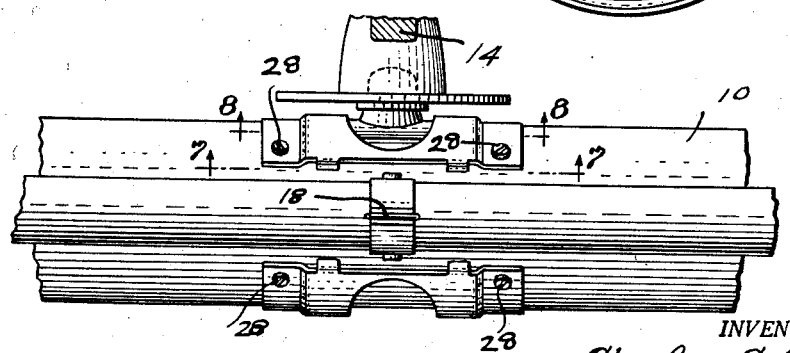
INVENTOR.
Charles Schultz
BY
ATTORNEY April 2, 1957 C. SCHULTZ 2,787,320
DUAL FACED PHOTOGRAPHIC SCREEN
Filed Dec. 14, 1955 2 Sheets-Sheet 2
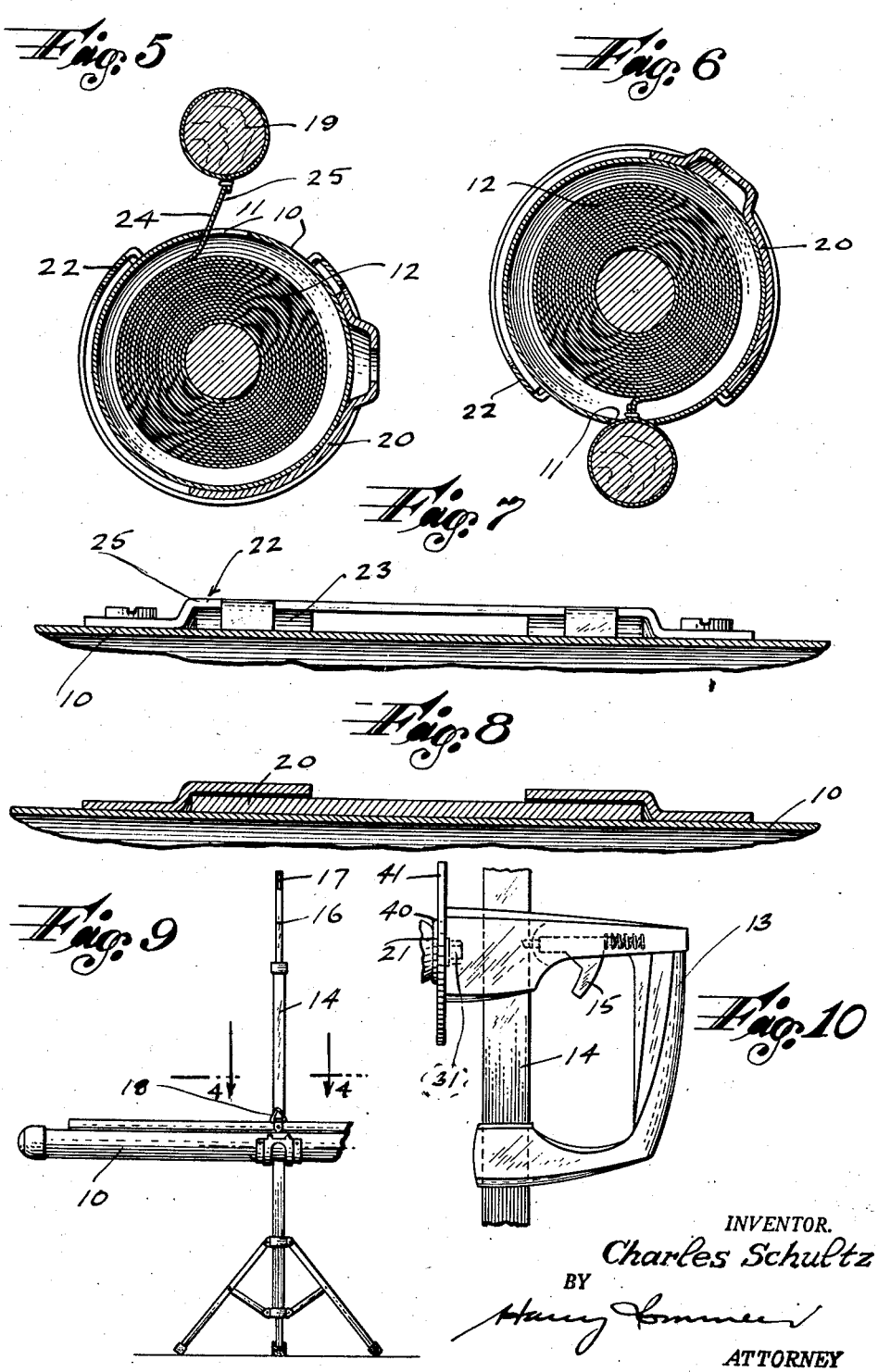
INVENTOR.
Charles Schultz
BY
ATTORNEY

United States Patent Office 2,787,320
Patented Apr. 2, 1957

2,787,320

DUAL FACED PHOTOGRAPHIC SCREEN

Charles Schultz, Brooklyn, N. Y.

Application December 14, 1955, Serial No. 553,090

9 Claims. (Cl. 160—24)

This invention relates to improvements in screens such as, for example, are used in the projection of images and pictures, and is more particularly directed to the provision of novel means enabling both faces of the screen to be selectively utilized as desired. Pursuant to the invention it is possible, for example, to provide a screen having a face of high light-reflecting characteristics, and an opposite face of mat or dull reflecting characteristics.

The above examples indicate a few of the many practical uses to which the invention is adapted. Other uses, which will become apparent on consideration of the attached drawings, description and claims, shall be deemed to come within the purview of this application, and to be covered thereby.

In the drawings,

Fig. 1 is an exploded perspective view of a rail plate and track plate embodying the invention, Fig. 2 is a similar view of the same parts, shown assembled, Fig. 3 is a longitudinal sectional view, taken on line 3—3 of Fig. 2, Fig. 4 is a fragmentary, top plan view taken on line 4—4 of Fig. 9, Fig. 5 is a medial transverse sectional view of the screen receiving casing and associated parts prior to assembly on a bracket such as shown at 13 in Fig. 10 so as to dispose one face 24 of the screen forwardly of the post 14, Fig. 6 is a similar view, showing the screen casing swiveled 180° or to half the extent of rotation required to dispose the other face 25 of the screen forwardly of post 14, pursuant to the invention, Fig. 7 is a fragmentary sectional view taken on line 7—7 of Fig. 4, Fig. 8 is a fragmentary sectional view taken on line 8—8 of Fig. 4, Fig. 9 is a fragmentary front elevational view of the device of this invention shown applied to a post, and Fig. 10 is an enlarged fragmentary view of one form of bracket to which the screen casing may be secured in carrying out the invention.

In the drawings, a screen casing 10 (Figs. 4 and 5) is shown having a longitudinal slot 11 (Figs. 5 and 6) through which the screen 12 may be withdrawn to. The casing is mounted on a bracket 13 which is slidably disposed on a post 14. The bracket 13 may be of any desired design or configuration—that shown in Fig. 10 and designated by the reference character 13 is illustrative of one of an infinite variety of brackets in connection with which the invention may be used, as will become readily apparent from a consideration of the following description. Bracket 13 is adjustably secured on the post 14; to that end, the bracket may be generally U-shaped, with the free ends thereof provided with openings through which the post 14 may pass. As shown in Fig. 10 the bracket may be further provided with latch means such as indicated at 15, for adjustably positioning it at the desired point along the post 14. The post 14 may be provided with a telescopic section 16 and, may have, at the upper end thereof, a hook or the like, 17, to be engaged by a hook or the like 18, on the bar 19 to which the free end of the screen 12 is secured (Fig. 5).

The device of this invention, in the form shown in Fig. 1, comprises a rail plate 20 of longitudinally arcuate outline; means 21 (Fig. 10) are provided engaging the rail plate 20 and the bracket 13 to swivelly mount the plate on the bracket, and means 22 (Figs. 1 and 7) are provided on the screen casing 10, defining therewith an arcuate slide 23 to receive the plate 20. Thus the screen casing 10 may be rotated from a position such as that shown in Fig. 5 wherein one face 24 thereof will be disposed forwardly of the post when the screen 12 is withdrawn from casing 10 to a second position wherein the other face 25, of the screen will be disposed forwardly of the post on withdrawing the screen from the casing. This end is attained by swivelly rotating the casing 10 on the means 21 from the Fig. 5 position to the Fig. 6 position and then continuing the same around the remaining 180° (or other half of the circle of rotation) to again dispose the slot 11 of the casing 10 in the upper position; however, in the last mentioned, second position, the opposite face 25 of the screen will be disposed forwardly of the post on withdrawing the screen from the casing.

If it is desired to adjust the position of the casing so that the slot 11 thereof will be disposed closer to or farther from the post 14, that may readily be done by rotating the casing 10 on the rail plate 20. The operation of swiveling the casing 10 so as to present the opposite faces of the screen selectively forwardly of the post may be repeated of course as frequently as desired.

The means 22 on the casing 10 defining therewith the arcuate channel slide 23 may comprise a track plate 25 of arcuate longitudinal outline conforming to that of the rail plate 20. Said track plate may be secured to the casing 10 by providing the track plate with marginal portions 26, 27 through which screws, rivets or the like 28 may be passed. The track plate 25 may be provided with a medial longitudinally offset portion 29, defining, essentially, a shouldered track intermediate the marginal portions 26, 27, to receive the rail plate 20.

The means 21 engaging the rail plate and bracket 13, to swivel the rail plate on the bracket may comprise, as shown in the drawings, a pin 30 secured to the bracket in any suitable or desired manner, as, for example (Fig. 10) by molding or otherwise securing to the bracket 13 an internally threaded member 31 with which the pin 30 is adapted to have threaded engagement. The pin 30 may be formed unitarily with the rail plate 20, or secured thereto as shown in Fig. 3 by providing the rail plate with an aperture 32 through which pin 30 passes, and providing keying means, such as the formation of the aperture 32 of non-circular form for engagement with a complementary non-circular portion 33 of the pin 30. The pin 30 may be provided with an enlarged head 38 to be received in a boss 39 on the rail plate 20. If desired, a washer 40 and a flat disc 41 may be secured intermediate the bracket 13 and the rail plate 20 so that the rail plate will rotate on the flat disc 41 or on the washer 40 or on both, when the casing 10 is swiveled as above noted. The track plate 25 is preferably provided with a longitudinal slot 42 to receive the pin 30 and is preferably provided with stop members such as 43 (which may be disposed at the ends of the track plate, Fig. 1) to prevent excessive movement of the track plate relative to the rail plate. Said stop members project into the plane of the slide 23 defined by the track plate 25 and casing 10 (Fig. 7).

Having thus described my invention, what I claim as new and desire to secure by Letters Patent is:

1. A device for mounting a screen casing, having a longitudinal slot through which the screen may be withdrawn to display the same comprising a post, a bracket slidably disposed on said post, a longitudinally arcuate rail plate, means engaging the rail plate and bracket swivelly mounting the plate on the bracket, and channel means on the screen casing defining therewith an arcuate slide to receive the plate, whereby the screen casing may be rotated on the rail plate to position the longitudinal slot of the casing upwardly to withdraw the screen from the housing, thereby disposing one face of the screen forwardly of the post, and the screen may be returned to the housing and the housing swivelled on the bracket and then rotated on the rail plate to dispose the housing slot upwardly, so that the screen may be withdrawn from the housing to dispose the other face of the screen forwardly of the post.

2. In a device as set forth in claim 1, said means on the screen casing defining therewith an arcuate slide to receive the rail plate, comprising a track plate of arcuate longitudinal outline conforming to that of the rail plate, marginally secured to the casing, and having a medial portion intermediate the marginal portions thereof offset to define, with the casing, said arcuate slide.

3. In a device as set forth in claim 2, stop members on the track plate, projecting into the plane of said slide, to prevent excessive movement of the screen casing track plate on the rail plate.

4. In a device as set forth in claim 1, said means engaging the rail plate and bracket to swivelly mount the plate on the bracket comprising a pin fixed to the bracket and passing through an opening in the rail plate and having a head of larger diameter than said opening.

5. In a device as set forth in claim 4, said rail plate having an offset portion to form a seat for said pin head.

6. In a device as set forth in claim 5, said pin and rail plate having complementary means to key the plate to the pin.

7. In a device as set forth in claim 2, said track plate having a slot to receive the pin.

8. In a device as set forth in claim 3, said stop members being disposed at the ends of the track plate.

9. In a device as set forth in claim 1, said channel means on the screen casing including a longitudinally offset portion defining a shouldered track to receive the plate.

References Cited in the file of this patent
UNITED STATES PATENTS 2,377,553     Heck et al. _____ June 5, 1945